US006855020B2

(12) United States Patent
Kaji

(10) Patent No.: US 6,855,020 B2
(45) Date of Patent: Feb. 15, 2005

(54) RUNNING CONTROL DEVICE FOR WATERCRAFT

(75) Inventor: Hirotaka Kaji, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 0 days.

(21) Appl. No.: 10/169,789

(22) PCT Filed: Oct. 19, 2001

(86) PCT No.: PCT/JP01/09194

§ 371 (c)(1), (2), (4) Date: Jul. 1, 2002

(87) PCT Pub. No.: WO02/36954

PCT Pub. Date: May 10, 2002

(65) Prior Publication Data

US 2003/0003822 A1 Jan. 2, 2003

(30) Foreign Application Priority Data

Oct. 30, 2000 (JP) ...................................... 2000-330301

(51) Int. Cl.[7] ................................................ B60K 41/00
(52) U.S. Cl. ............................................. 440/84; 440/1
(58) Field of Search ............................... 440/1, 84, 87; 701/21

(56) References Cited

U.S. PATENT DOCUMENTS 3,552,349 A * 1/1971 Snow ...................... 114/55.57
4,767,363 A 8/1988 Uchida et al.
5,190,487 A * 3/1993 Fukui ............................ 440/1
5,203,727 A * 4/1993 Fukui ............................ 440/1
5,586,535 A * 12/1996 Syomura .................... 123/352
5,613,887 A * 3/1997 Kobayashi ................... 440/47
5,715,793 A 2/1998 Motose
5,762,053 A 6/1998 Anamoto
5,833,501 A * 11/1998 Jones ............................ 440/1
5,846,103 A * 12/1998 Varney et al. ................ 440/38

(List continued on next page.)

FOREIGN PATENT DOCUMENTS

EP 1 033 637 A2 9/2000
EP 1 039 356 A1 9/2000

(List continued on next page.)

OTHER PUBLICATIONS

U.S. Appl. No. 09/813,465 entitled Engine Output Control for Watercraft filed Mar. 19, 2001 with 15 sheets of drawings in 53 pages.

(List continued on next page.)

*Primary Examiner*—Andrew Wright
(74) *Attorney, Agent, or Firm*—Knobbe, Martens, Olson & Bear, LLP

(57) ABSTRACT

To provide a running control device for a watercraft capable of effecting an easy cruising control of the watercraft even by a beginner, especially allowing a stable running while turning, and capable of reducing cavitation. A running control device 16 for a watercraft with a propulsion device 15 capable of controlling propulsion, comprises a propulsion control section 17 which controls propulsion, based on predetermined input information, said propulsion control section 17 comprising a target propulsion calculation module 18 for determining a target propulsion, based on predetermined input information including at least velocity of said watercraft; and an operation amount calculation module 19 for determining the amount of operation of said propulsion device 15, based on predetermined input information so as to obtain the target propulsion determined by said propulsion calculation module 18.

20 Claims, 13 Drawing Sheets

U.S. PATENT DOCUMENTS

| | | | | | |
|---|---|---|---|---|---|
| 5,928,040 | A | * | 7/1999 | Wharton | 440/1 |
| 6,021,369 | A | | 2/2000 | Kamihira et al. | |
| 6,079,389 | A | * | 6/2000 | Ono et al. | 123/352 |
| 6,109,986 | A | * | 8/2000 | Gaynor et al. | 440/87 |
| 6,151,548 | A | | 11/2000 | Kamihira et al. | |
| 6,216,663 | B1 | * | 4/2001 | Kato et al. | 123/305 |
| 6,273,771 | B1 | * | 8/2001 | Buckley et al. | 440/84 |
| 6,317,658 | B1 | * | 11/2001 | Vian | 701/1 |
| 6,349,293 | B1 | | 2/2002 | Yamaguchi | |
| 6,386,930 | B2 | | 5/2002 | Moffet | |
| 6,517,396 | B1 | * | 2/2003 | Into | 440/84 |
| 6,659,815 | B2 | * | 12/2003 | Motsenbocker | 440/1 |
| 2002/0028613 | A1 | | 3/2002 | Matsuda, et al. | |

FOREIGN PATENT DOCUMENTS

| | | |
|---|---|---|
| EP | 1 085 460 A2 | 3/2001 |
| EP | 1 033 637 A3 | 5/2001 |
| EP | 1 107 077 A2 | 6/2001 |
| EP | 1 107 078 A1 | 6/2001 |
| EP | 1 152 312 A2 | 11/2001 |
| JP | 7-301134 | 1/1995 |
| JP | 7-110702 | 4/1995 |
| JP | 10-029595 | 4/1997 |
| JP | 11-022606 | 1/1999 |
| JP | 11-062660 | 3/1999 |
| JP | 2000-250602 | 9/2000 |
| JP | 2000-250603 | 9/2000 |
| JP | 2000-250604 | 9/2000 |
| JP | 2000-276206 | 10/2000 |
| JP | 2001-084237 | 3/2001 |
| JP | 2001-152898 | 6/2001 |
| JP | 2001-159903 | 6/2001 |
| JP | 2001-306137 | 11/2001 |
| WO | WO 02/36954 A1 | 5/2002 |

OTHER PUBLICATIONS

U.S. Appl. No. 09/813,438 entitled Secondary Thrust Arrangement for Small Watercraft filed Mar. 19, 2001 with 17 sheets of drawings in 45 pages.

U.S. Appl. No. 10/0801,371 entitled Engine Control for Watercraft, filed Feb. 15, 2002 with 11 sheets of drawings in 46 pages.

U.S. Appl. No. 08/879,978 entitled State–Control System Using Learning Function filed Jun. 20, 1997 with 12 sheets of drawings in 29 pages.

Preliminary Search Report from the Japanese Patent Office dated Dec. 18, 2001 International Application No. PCT/JP01/09194 (full English translation).

* cited by examiner

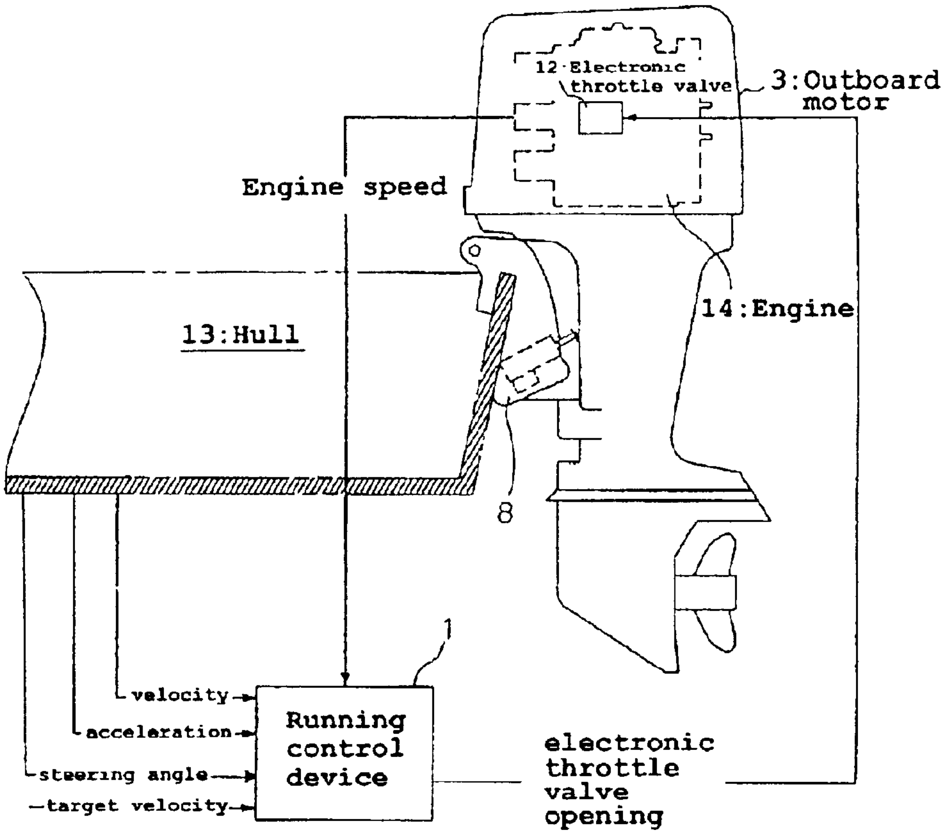
[FIG. 1]

[FIG. 2]
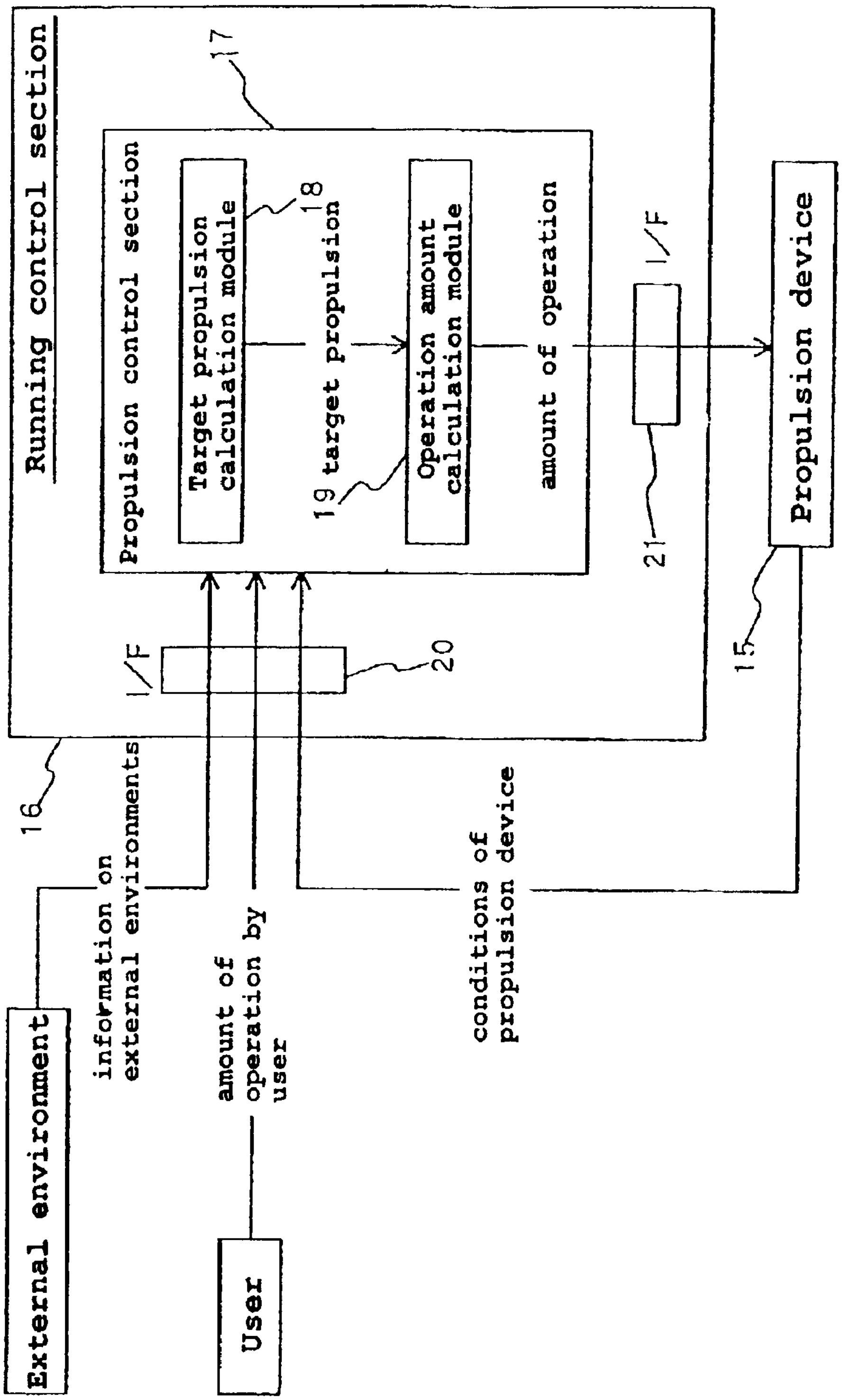

[FIG. 3]
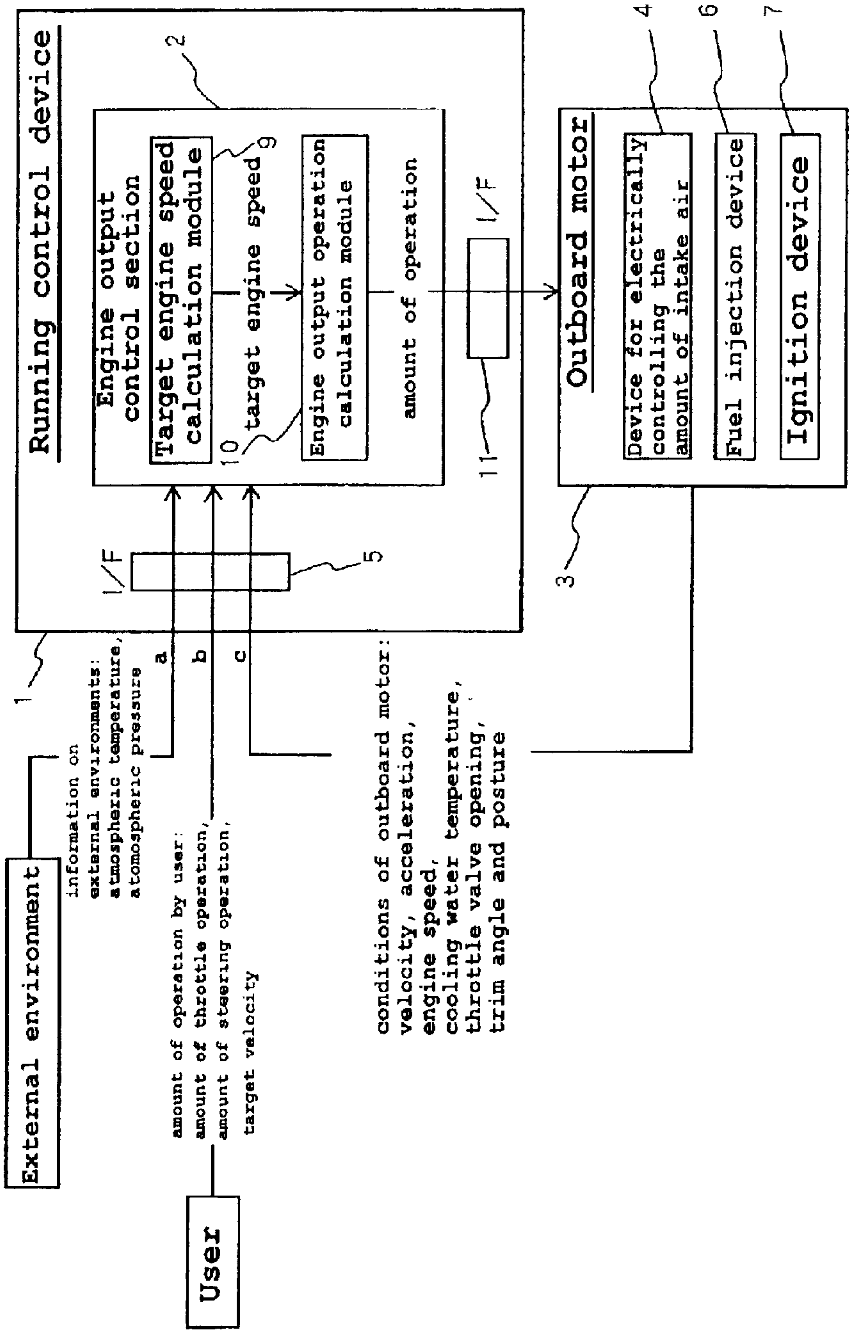

[FIG. 4]
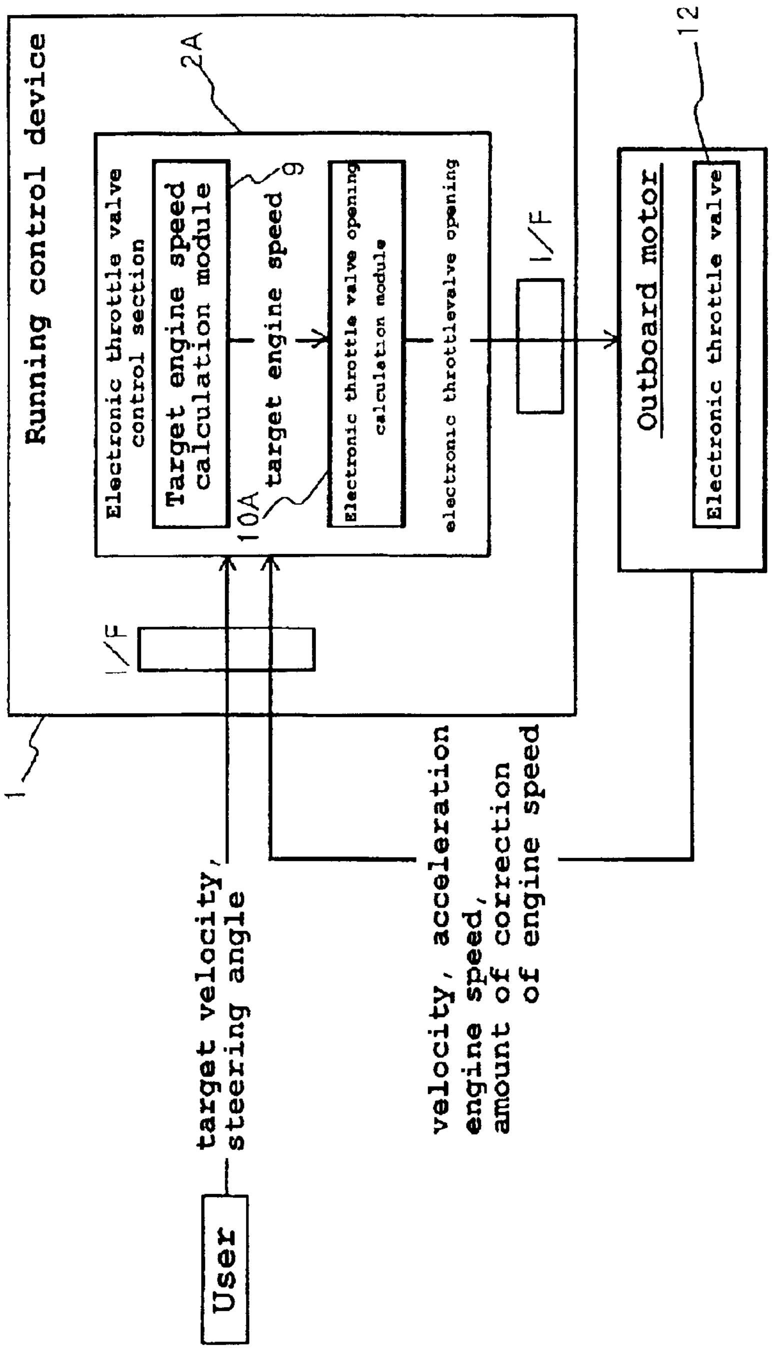

[FIG. 5]
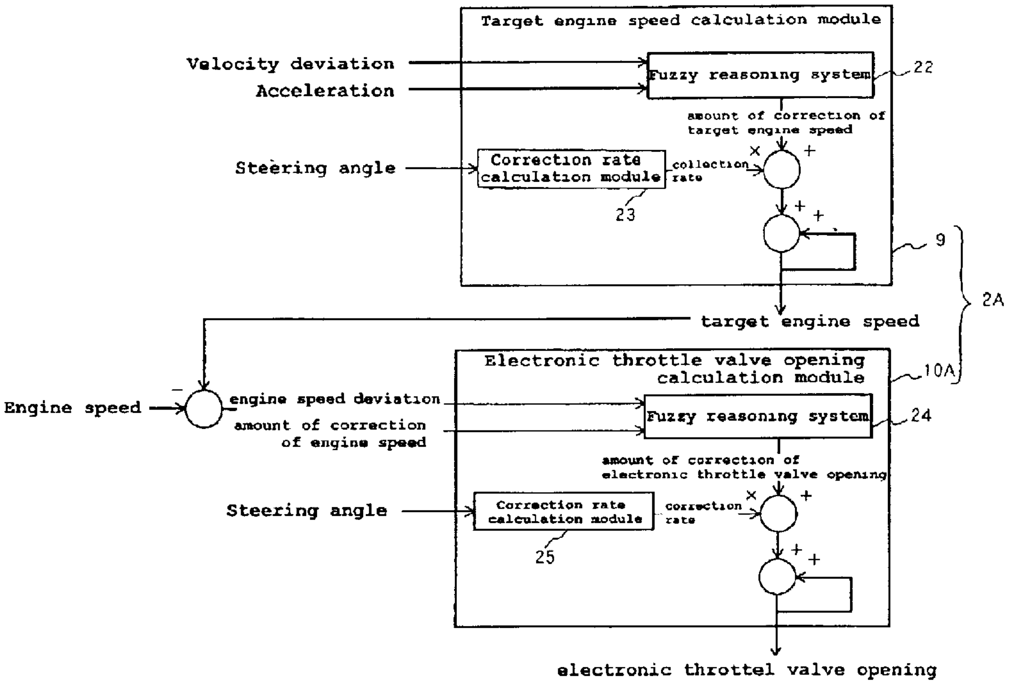

[FIG. 6]
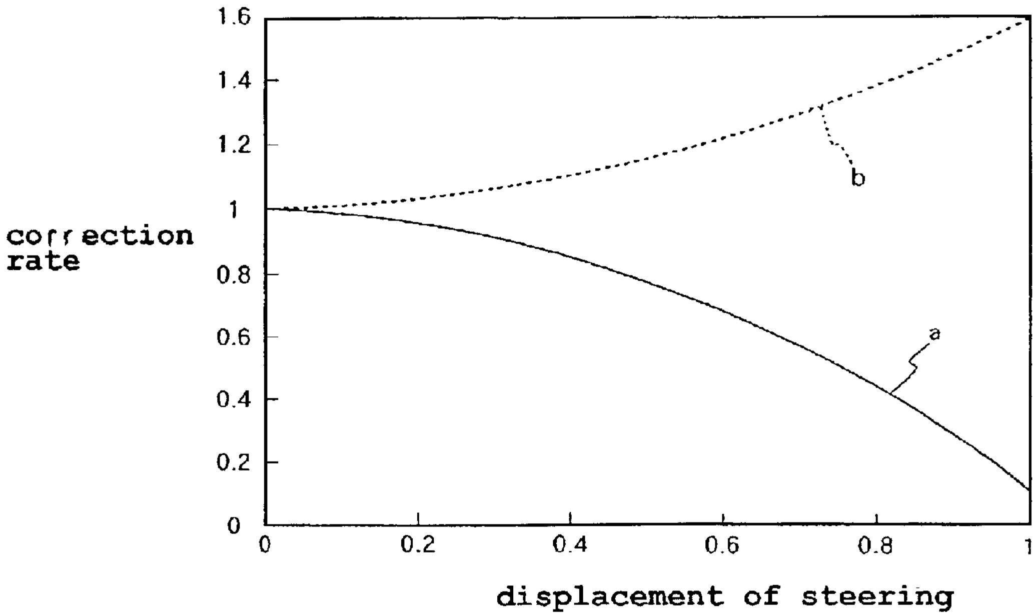

[FIG. 7]
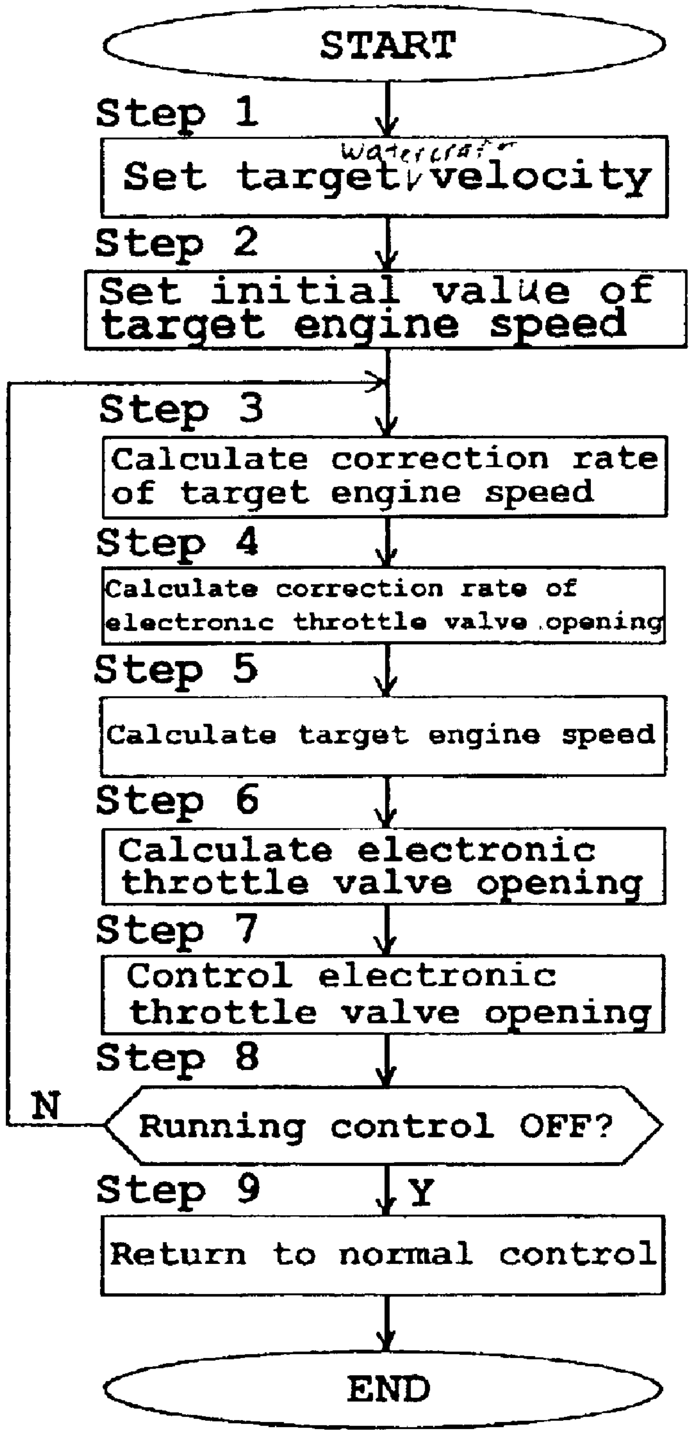

[FIG. 8]
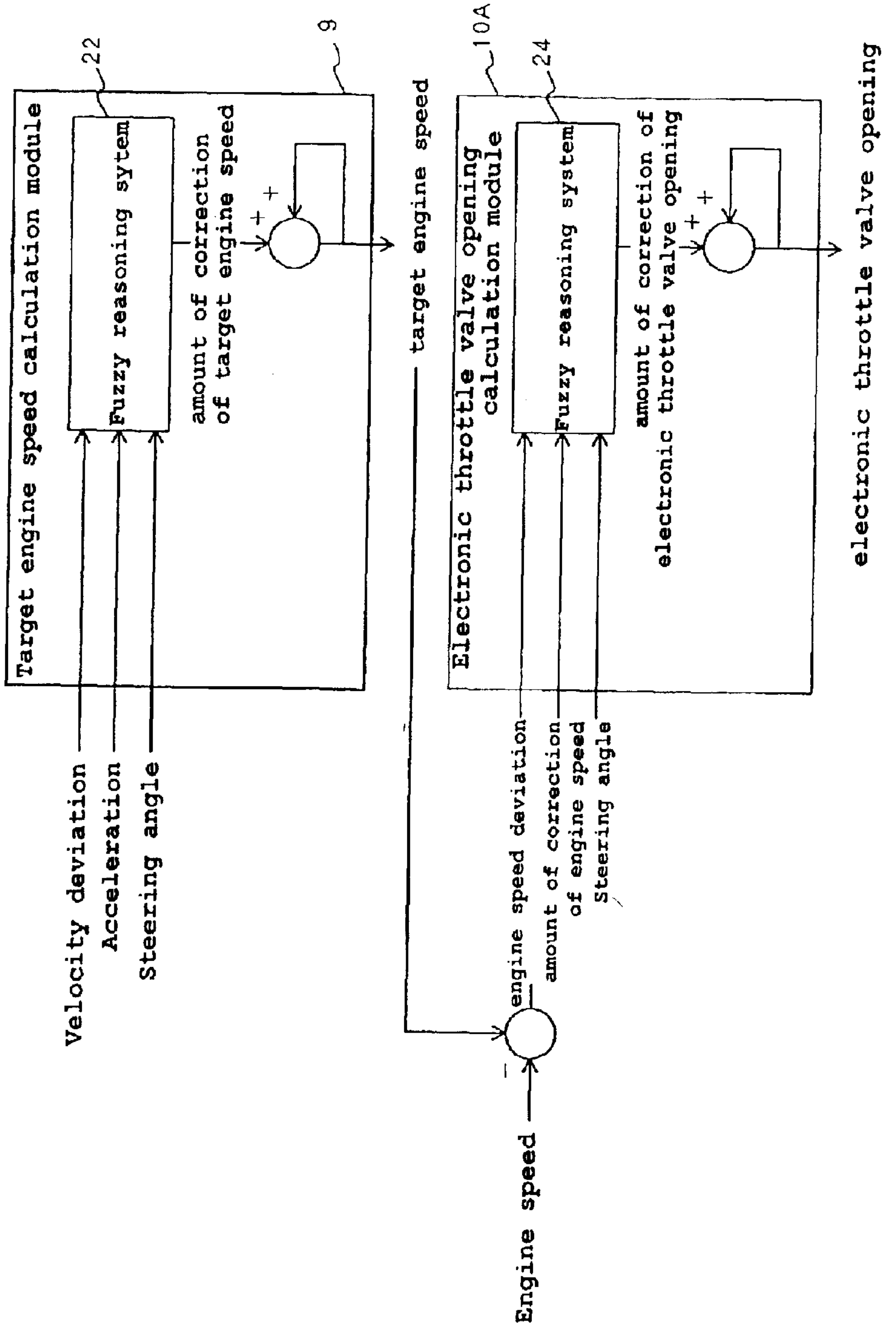

[FIG. 9]
(A)
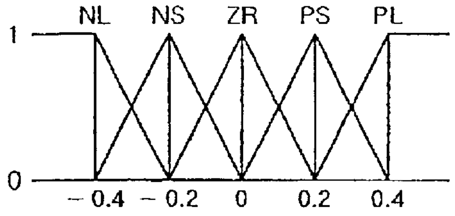
acceleration [km/h/100ms]
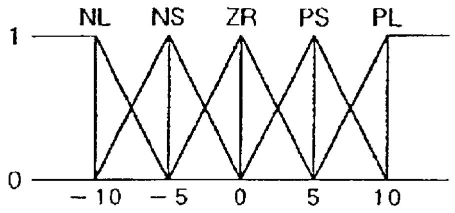
velocity deviation [km/h]
Membership Function
(B)
acceleration
| velocity deviation | NL | NS | ZR | PS | PL |
|---|---|---|---|---|---|
| NL | 50 | 50 | 0 | − 50 | − 100 |
| NS | 100 | 100 | 20 | − 10 | − 100 |
| ZR | 100 | 100 | 20 | − 10 | − 100 |
| PS | 10 | 10 | − 10 | − 100 | − 200 |
| PL | − 50 | − 100 | − 200 | − 200 | − 500 |
amount of correction of target engine speed [rpm/100ms]
Fuzzy Rule

[FIG. 10]
(A)
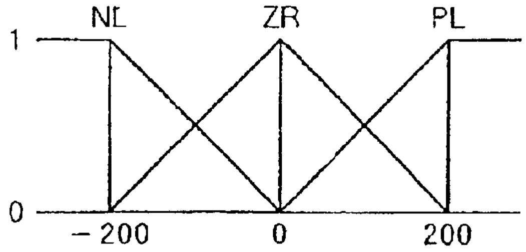
amount of correction of engine speed [rpm/500ms]
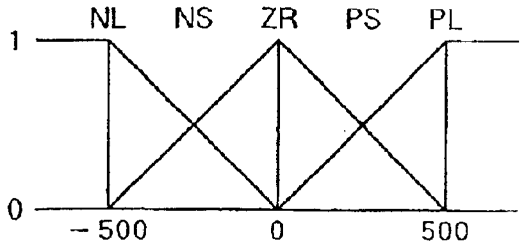
engine speed deviation [rpm]
Membership Function
(B)
amount of correction of engine speed
| engine speed deviation | NL | ZR | PL |
|---|---|---|---|
| NL | 8.621 | 0.345 | −0.345 |
| ZR | 4.138 | 0.000 | −4.138 |
| PL | 0.345 | −0.345 | −8.621 |
amount of correction of throttle opening [%/500ms]
Fuzzy Rule

[FIG. 11]
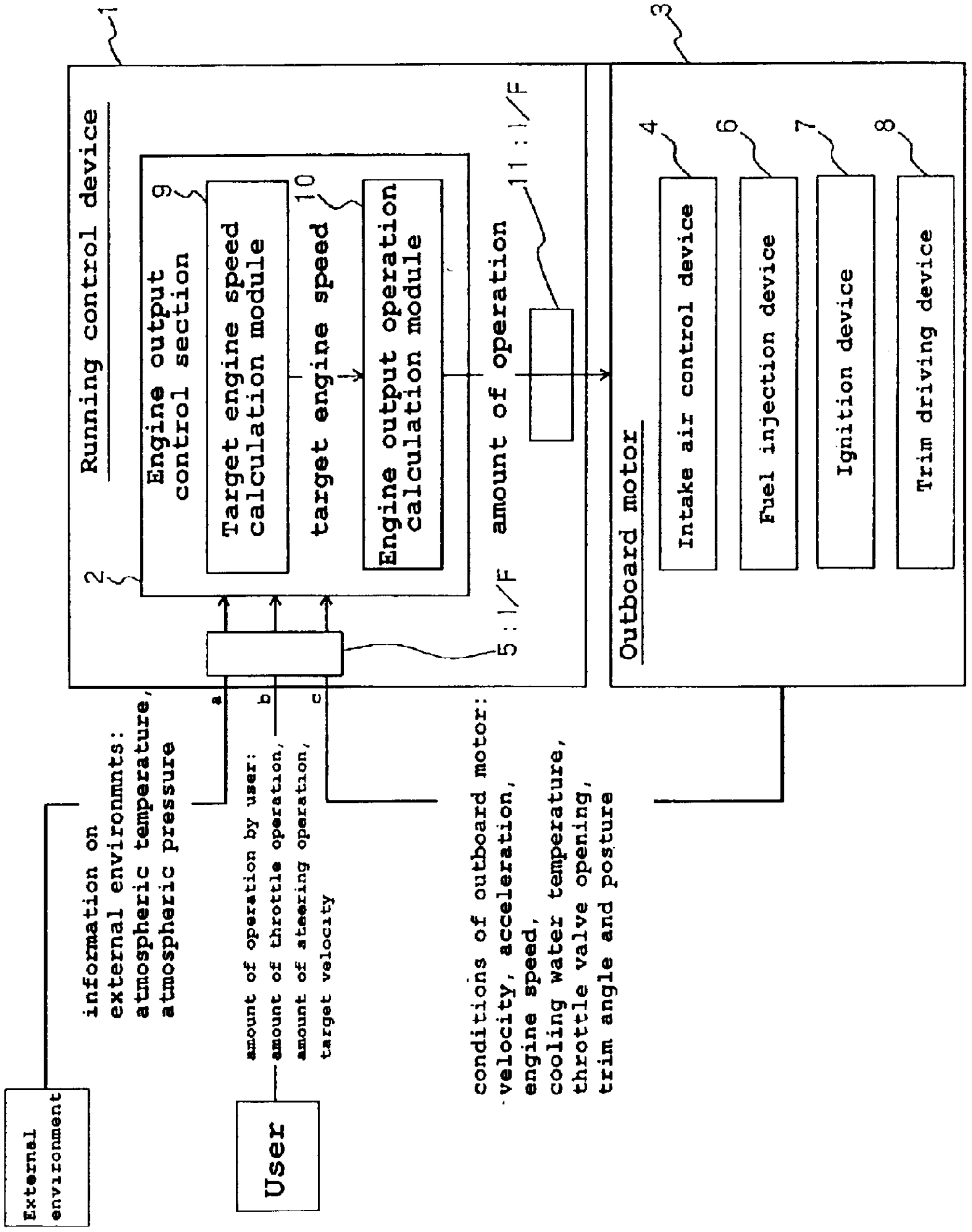

[FIG. 12]
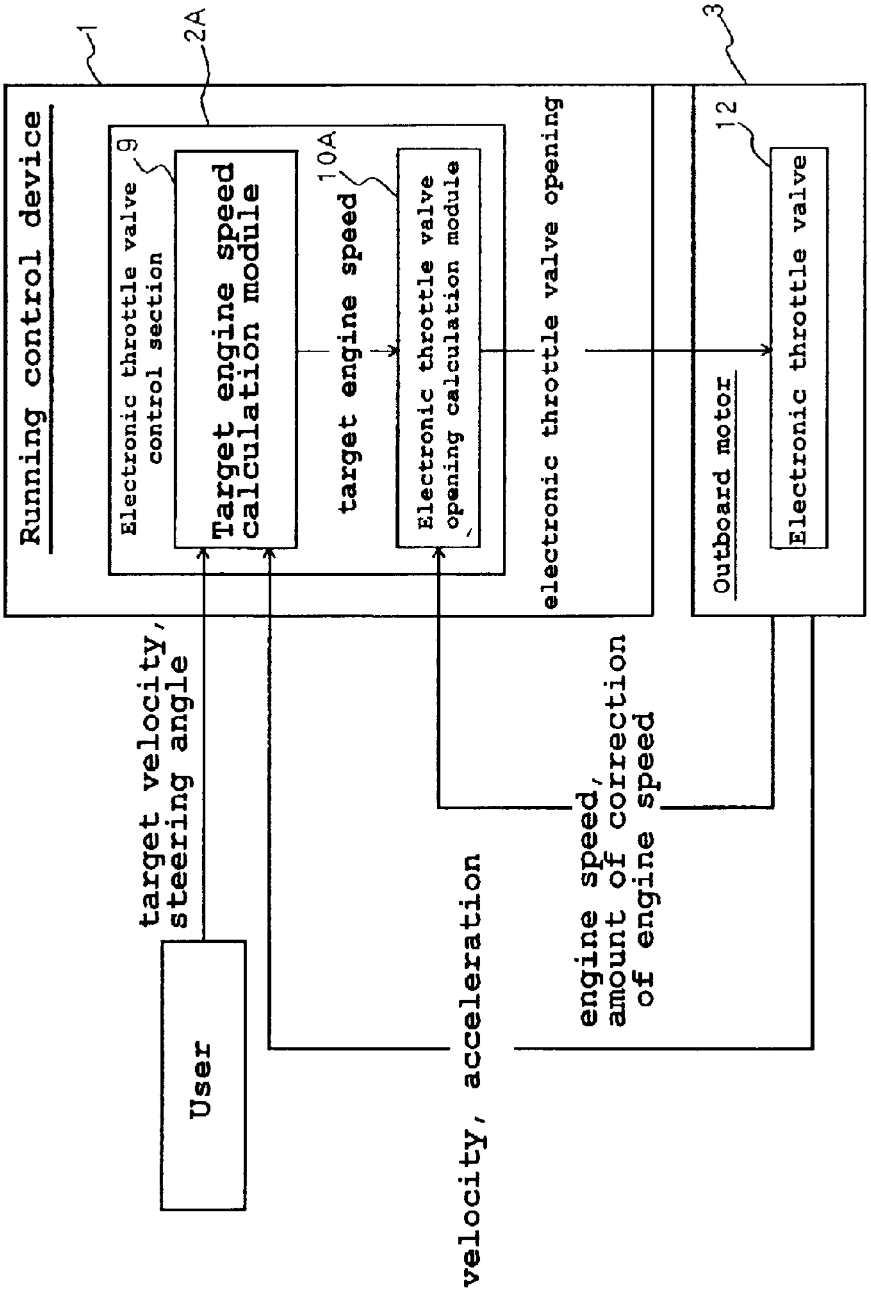

[FIG. 13]
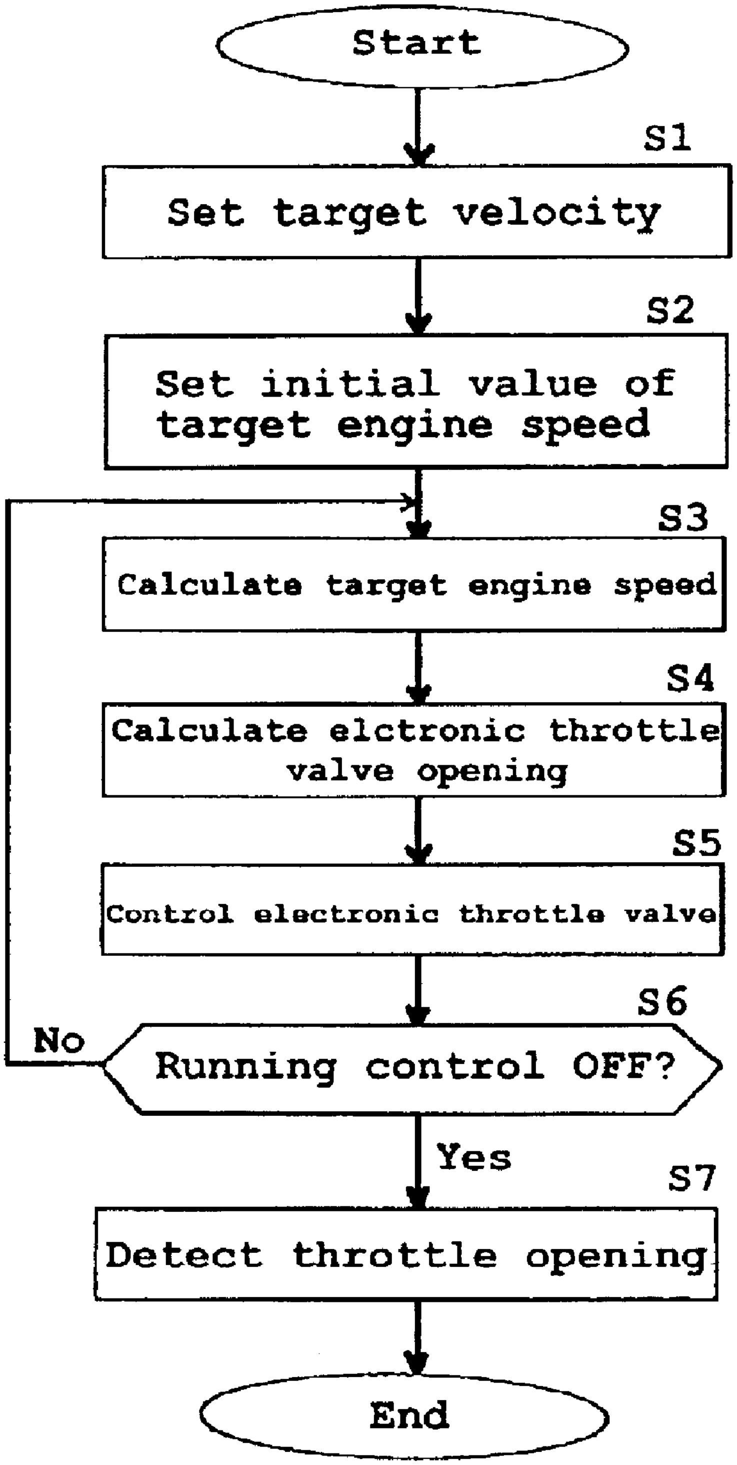

RUNNING CONTROL DEVICE FOR WATERCRAFT

RELATED CASES

This application is a national phase filing under 35 U.S.C. § 371 of PCT Application No. PCT/JP01/09194, filed Oct. 19, 2001, which claims priority to Japanese Application No. 2000-330301, filed Oct. 30, 2000, the entire contents of which are hereby expressly incorporated by reference.

BACKGROUND OF THE INVENTION

1. Field of the Invention

The invention relates to a running control device for a watercraft with a device for electrically controlling the amount of intake air to an engine.

2. Description of the Related Art

In conventional watercrafts, a throttle lever manipulable by a user and a throttle valve provided in an intake passage of a propulsion device constituted by an engine, are mechanically connected to each other with a cable or other mechanical elements. A throttle valve opening is determined uniquely by throttle lever operation.

Alternatively, it is possible, as proposed in JP-A-2000-108995, that a throttle controller generates an electrical signal to drive an actuator mounted on a throttle valve so that the relation between throttle lever position and throttle valve opening is set to be non-linear, yet the throttle valve opening is determined uniquely by the throttle lever position.

Control of a watercraft is difficult for a beginner, and it takes a veteran driver to operate the watercraft skillfully. For example, when cruising, during which a watercraft runs at a constant speed, specifically in water-skiing, trolling, or the like, the user (driver) should take notice of engine speed and watercraft velocity at all times and fine-tune the throttle opening continuously.

However, the circumstances surrounding a watercraft are not always constant, and the characteristics of ship control change widely depending on various disturbances. For example, the area of submerged portions of the hull changes with changes in weather or sea conditions, the number of crew, the amount of gear, steering operation or trimming operation, or the like, and running resistance changes accordingly, which causes engine speed or watercraft velocity to change every moment even if throttle opening is constant. Controlling a watercraft during cruising in such circumstances while fine-tuning the throttle opening can be burdensome and thus the driver can be distracted especially if he is a beginner.

In addition, if velocity and throttle opening are ill-balanced during ship control, a phenomenon called cavitation, where the propeller races due to formation of air bubbles, may occur, which raises engine speed abruptly, resulting in damage to the engine, propeller, or other driving systems.

An engine speed control system or a velocity control system can be used for a conventional control device for watercraft cruising.

One benefit of an engine speed control system is that cavitation is quickly suppressed as soon as it happens. However, when the resistance between the hull and the water changes, a driver should change the target engine speed in order to maintain a constant watercraft speed.

A benefit of a watercraft velocity control system is that a watercraft can run at a target speed regardless of the change of the resistance to a hull. However, when cavitation occurs, the thrust is reduced which causes the watercraft to slow. The velocity control system then further opens the throttle to compensate for the reduced watercraft velocity, whereby more cavitation is caused.

While a watercraft is running with an engine speed cruising control system, and if an operation, like turning is performed, which changes the posture of the hull rapidly, the resistance to the hull is increased whereby velocity relative to water is decreased. If a watercraft velocity control system is employed, and the velocity is decreased considerably, a throttle is opened to compensate for the change in watercraft velocity and the probability of the generating cavitation will be increased.

In view of the foregoing, it is an object of the invention to provide a running control device for a watercraft capable of effecting an easy cruising control of the watercraft even by a beginner, especially, allowing stable running while turning, and preventing cavitation.

SUMMARY OF THE INVENTION

In order to achieve the foregoing object, the invention provides a running control device for a watercraft with a propulsion device capable of controlling propulsion, comprising: a propulsion control section for controlling propulsion, based on predetermined input information, said propulsion control section comprising a target propulsion calculation module for determining a target propulsion based on said predetermined input information, including at least velocity of said watercraft; and an operation amount calculation module for determining the amount of operation of said propulsion device, based on said predetermined input information so as to obtain the target propulsion determined by said target propulsion calculation module.

According to this arrangement, a target propulsion is automatically calculated, based on predetermined input information, including velocity, and the amount of operation of the propulsion device is calculated, based on the predetermined input information, so that the calculated target propulsion is obtained. This provides optimum propulsion in response to driving conditions at all times. In this case, since the velocity is included as a parameter for calculation of the target propulsion, it is detected when the velocity is decreased by cavitation, for example, so as to suppress the cavitation by decreasing the amount of propulsion.

Also, with this arrangement, if a target velocity for constant speed cruising, for example, is inputted to the engine output control section, this control section calculates a target engine speed corresponding to the target velocity, automatically operates the intake air control device through electrical control according to the target engine speed, and automatically controls engine output so as to maintain the target velocity. The target engine speed may be directly inputted in place of the target velocity. In this case, as in the previous one, the engine output control section automatically operates the intake air control device through electrical control according to the target engine speed, to automatically control engine output. Therefore, the driver need not take notice of the engine speed being maintained through throttling operation, allowing him to concentrate on steering operation, providing easier control of the watercraft.

In addition, if cavitation (racing of the propeller) happens, the amount of operation of the intake air control device is calculated to decreased engine speed, so that an immediate action is taken automatically against cavitation, and damage to the engine, propeller, or other driving systems can also be avoided.

An engine, a motor, or a water jet drive are examples of the above propulsion device. In the case of an engine, the amount of intake air, the amount of fuel injection, and an ignition timing or the like are controlled so that the actual engine speed follows the target engine speed in order to obtain the target propulsion.

In the case of an electric motor, the voltage (the current) is controlled so that the actual motor speed follows the target motor speed in order to obtain the target propulsion.

In the case of a water jet drive, the amount of intake air, the amount of fuel injection, and an ignition timing or the like are controlled so that the actual engine speed follows the target engine speed in order to obtain the target propulsion.

A preferred example of such an arrangement is characterized in that said propulsion device is an engine; and that said running control device comprises an engine output control section for controlling the engine output, based on predetermined input information, using at least one of an intake air control device, an electronically controlled fuel injection device, or an ignition control device, said engine output control section comprising a target engine speed calculation module for determining a target engine speed, based on predetermined input information including at least information on velocity of said watercraft; and an operation amount calculation module for determining the amount of operation of said engine output control section, based on predetermined input information, so as to obtain the target engine speed determined by said target engine speed module.

According to this arrangement, an engine is used as a propulsion device. Engine output is controlled by using an intake air control device such as a throttle valve, an electronically controlled fuel injection device such as a magnetic, e.g. solenoid-driven, fuel injection valve (an injector), or an ignition control device constituted by an ignition coil or the like. A target engine speed is calculated, based on predetermined input information including information on velocity, and an amount of operation of output control is calculated, based on predetermined input information so as to obtain the target engine speed.

A preferred example of such an arrangement is characterized in that said target engine speed calculation module determines the target engine speed derived from at least velocity among information on velocity, acceleration, engine speed, trim angle, pitch angle, and user's input by hand, and at least one of steering angle and rolling angle as input information.

According to this arrangement, a turning condition is judged by detecting a steering angle or a rolling angle corresponding to a handle operation in addition to information on velocity which allows a stable running control while turning and prevents cavitation.

In addition, by selectively using several kinds of information on a watercraft including information such as the calculated or inputted target engine speed and the current engine speed, the amount of operation of a throttle valve can be calculated properly such that engine speed follows the target engine speed, for example, based on the difference between the target engine speed and the current engine speed. In this case, control may be made using other information as a means of adjusting the gain of engine speed control, such as a riding feeling-oriented control in which the gain is decreased when steering angle is small, or a following-up characteristic-oriented control in which the gain is increased when the steering angle is large.

Still another arrangement is characterized in that said target engine speed calculation module calculates the target engine speed based on a fuzzy rule, or "fuzzy logic."

According to this arrangement, the setting of the fuzzy rule is based on the amount of driving operation of an experienced driver and the operation according to the fuzzy rule facilitates a stable and proper operation by a beginner as if by an experienced driver. Especially, the best amount of operation can be easily set by using the fuzzy rule when the running condition and the best amount of operation corresponding to it is non-linear.

That is, skill or knowledge of an experienced driver is incorporated in the fuzzy rule to facilitate proper control of a watercraft by a beginner. In this case, a neural network or a Cerebellar Model Arithmetic Computer (CMAC) may be utilized. Also, a learning system may be formed which learns a control method of a skilled driver to update rules, maps, or control routines.

Still another arrangement is characterized in that said target engine speed calculation module decreases the correction of the target engine speed as a steering angle increases from the a straight-ahead position.

According to this arrangement, as the steering angle is increased, that is, in the state of a small turn, the correction of the target engine speed is decreased so as to always facilitate a stable running while turning.

Still another arrangement is characterized in that said target engine speed calculation module decreases the correction of the target engine speed as a rolling angle increases from a striaght ahead position.

According to this arrangement, as the rolling angle is increased, that is, in the state of a small turn, the correction of the engine speed is decreased so as to always facilitate a stable running while turning.

Still another arrangement is characterized in that said operation amount calculation module determines the amount of operation of said engine output control section from at least a target engine speed and engine speed, among target engine speed, engine speed, velocity, acceleration, trim angle, and pitch angle, and at least one of the steering angle and rolling angle as an input.

According to this arrangement, the amount of operation can be controlled in response to the difference between the target engine speed and the actual engine speed and information on the steering angle or the rolling angle are added to judge the turning condition so as to control to facilitate a stable running while turning.

Still another example of the arrangement is characterized in that said operation amount calculation module calculates the amount of operation of said engine output control device based on a fuzzy rule.

According to this arrangement, the setting of the fuzzy rule is based on the amount of operation of an experienced driver and the operation according to the fuzzy rule facilitates a stable and proper operation by a beginner like that by an experienced driver. Especially, the best amount of operation can be easily set by using a fuzzy rule when the running condition and the best amount of operation corresponding to it is non-linear.

Still another arrangement is characterized in that said operation amount calculation module increases the amount of operation as a steering angle is increased from the straight-ahead position.

According to this arrangement, as the steering angle is increased, that is, in the state of a small turn, the amount of operation is increased so as to compensate for a larger resistance at the time of a small turn in order to always facilitate a stable running while turning.

Still another arrangement is characterized in that said operation amount calculation module increases the amount of operation as a rolling angle is increased from the horizontal position.

According to this arrangement, as the rolling angle is increased, that is, in the state of a small turn, the amount of operation is increased so as to compensate for a larger resistance at the time of a small turn in order to always facilitate a stable running while turning.

Another arrangement is characterized in that said intake air control device is an electronic throttle valve.

According to this arrangement, a reliable intake air control can be achieved using an electronic throttle valve in association with an electronically controlled potentiometer, or the like.

BRIEF DESCRIPTION OF THE DRAWINGS

FIG. 1 is a block diagram of a running control device for an outboard motor equipped with an electronic throttle valve;

FIG. 2 is a basic block diagram of a running control device of the invention;

FIG. 3 is a block diagram of the running control device of the invention;

FIG. 4 is a block diagram of the running control device of FIG. 3;

FIG. 5 is a block diagram of an electronic throttle valve control section of the running control device of FIG. 4;

FIG. 6 is graph of correction rate based on steering angle;

FIG. 7 is a flowchart, showing control operations of the electronic throttle valve control section of FIG. 5;

FIG. 8 is a block diagram of an electronic throttle valve control section of another embodiment of the invention;

FIG. 9A shows acceleration and velocity deviation membership functions;

FIG. 9B shows a fuzzy rule for calculation of the target engine speed based on the acceleration and velocity deviation membership functions shown in FIG. 9A;

FIG. 10A shows an amount of connection of engine speed and engine speed deviation membership functions;

FIG. 10B shows a fuzzy rule for calculation of the electronic throttle valve opening based on the amount of connection of engine speed and engine speed deviation membership functions shown in FIG. 10A;

FIG. 11 is a block diagram of a running control device of another embodiment of the invention;

FIG. 12 is a block diagram of the running control device of FIG. 11; and FIG. 13 is a flowchart, showing control operations of the electronically controlled valve control section of FIG. 12.

DETAILED DESCRIPTION OF THE PREFERRED EMBODIMENT

Now, an embodiment of the invention will be described below with reference to the drawings.

FIG. 1 is a block diagram of a running control device according to the invention incorporated in an outboard motor with an electronic throttle valve.

An outboard motor 3 is mounted on a transom of a hull 13 of a watercraft through a trim driving device (cylinder) 8. In an intake pipe (not shown) of an engine 14 of the outboard motor 3 is provided an electronic throttle valve 12, which is connected to a running control device 1. To the running control device 1 is inputted information on engine speed detected from the engine, and information on velocity, acceleration, steering angle, and target velocity inputted through a user by hand.

In such an arrangement, the running control device 1 calculates, as described below, an amount of operation of the electronic throttle valve 12 such that engine speed is obtained for a target watercraft velocity, based on the input information, and drives the electronic throttle valve 12 according to this amount of operation to automatically control engine output for running at a fixed target velocity.

FIG. 2 is a basic block diagram of a running control device 16 relating to the invention.

The running control device 16 for a watercraft which is equipped with a propulsion device 15 capable of controlling propulsion, comprises a propulsion control section 17 which controls propulsion, based on predetermined input information. The propulsion control section 17 comprises a target propulsion calculation module 18 for determining a target propulsion, based on predetermined input information including at least velocity of said watercraft, and an operation amount calculation module 19 for determining the amount of operation of said propulsion device 15, based on predetermined input information, such that the target propulsion determined by said propulsion calculation module 18 is obtained.

Data in the input information are detected data of a working condition of the propulsion device 15 such as watercraft velocity or engine speed, external environment data such as atmospheric temperature or atmospheric pressure, and the data on user's amount of operation such as the amount of operation of a throttle. These data are inputted through an interface 20 at the input side to the propulsion control section 17. The data on the amount of operation calculated in the propulsion control section 17 is outputted through an interface 21 at the output side to the propulsion device 15.

FIG. 3 is a block diagram of a running control device constructed in accordance with at least one aspect of the invention. This embodiment is one in which the invention is applied to a small watercraft with an outboard engine.

This running control device 1 is comprised of an engine output control section 2 provided on a hull, and adapted to drive, for control, a device provided on the outboard engine for electrically controlling the amount of intake air (intake air control device 4: for example, an electronic throttle valve) and other engine output related devices such as a fuel injection device 6, and ignition device 7. To the running control device 1 are inputted a signal a of the information on the external environments, a signal b of the information on the amount of user operation, and a signal c of the information on the conditions of the outboard engine through an interface 5 (input section). The information on the external environments is detected information on atmospheric temperature and atmospheric pressure. The information on the amount of user operation includes amount of throttling operation, amount of steering operation, and input on the target watercraft velocity. The conditions of the outboard engine include watercraft velocity, acceleration, engine speed, temperature of the cooling water, throttle valve opening, trim angle and posture of the watercraft.

The engine output control section 2 comprises a target engine speed calculation module 9 for determining target engine speed, based on predetermined input information, and an engine output operation amount calculation module 10 for determining the amount of operation of the intake air control device 4 such that engine speed follows the target engine speed determined by the target engine speed calculation module. The engine output operation amount calculation module 10 further calculates the amount of fuel injection of the fuel injection device 6 and ignition timing of the ignition device 7 and determines the amount of its driving operation to maintain the target engine speed. At this time, trim angle to be driven by the trim driving device (not shown) can also be calculated so as to determine the amount of its driving operation. Other driving devices (not shown) for controlling devices such as the intake air control device 4 and the fuel injection device 6 of the outboard motor 3 are driven, for control, through an interface 11 (at the output section), based on the amount of operation of the intake air control device 4, or the like, determined by the engine output operation amount calculation module 10, so as to obtain the target engine speed.

Thus, the target engine speed calculation module, for example, is arranged such that it calculates a target engine speed for a constant speed running, while the engine output operation amount calculation module 10 calculates an amount of operation of the intake air control device 4 such that actual engine speed follows the target engine speed, and the intake air control device 4 is driven by this amount of operation. Therefore, automatic running at a constant speed can be achieved without need of a user manipulating an operating lever (throttle) of the intake air control device 4.

In addition, if engine speed rises sharply beyond the target engine speed when cavitation happens, the engine output operation amount calculation module 10 drives the intake air control device 4 to decrease an amount of intake air, so that cavitation can be suppressed promptly.

FIG. 4 is a block diagram of the running control device of FIG. 3.

The running control device 1 is provided with an electronic throttle valve control section 2A (corresponding to the engine output control section 2 of FIG. 3). The electronic throttle control section 2A includes a target engine speed calculation module 9 for calculating target engine speed in response to the information on target watercraft velocity inputted by a user, and an electronic throttle valve opening calculation module 10A (corresponding to the engine output operation amount calculation module 10 of FIG. 3) for calculating opening of the electronic throttle valve 12 such that actual engine speed equivalent to the target engine speed is obtained, and drives the electronic throttle valve 12 by the amount of operation of the calculated electronic throttle valve opening. Thus, intake air for the target engine speed is supplied, so that engine output for the running at the target watercraft velocity is achieved, providing automatic cruising control at a constant speed.

FIG. 5 is a block diagram of the electronic throttle valve control section 2A of FIG. 4.

The target engine speed calculation module 9 is provided with a fuzzy reasoning system 22 which calculates the amount of correction of the target engine speed according to a fuzzy rule based on a watercraft velocity deviation and acceleration. While the amount of correction of the target engine speed is calculated by the fuzzy reasoning system 22, a correction rate calculation module 23 calculates a correction rate based on a steering angle, and the correction rate is multiplied by the above amount of correction of the target engine speed so as to obtain the data on the target engine speed.

A deviation of the engine speed is calculated according to the difference, between the data on the target engine speed and the data on the actual engine speed. The data on the deviation of the target engine speed and the data on the amount of correction of the engine speed are inputted to the fuzzy reasoning system 24 which is equipped in the electronic throttle valve opening calculation module 10A. The fuzzy reasoning system 24 calculates the amount of correction of the electronic throttle valve opening based on the above input data. While the amount of correction of the electronic throttle valve opening is calculated, a correction rate calculation module 25 calculates a correction rate based on a steering angle, and the correction rate is multiplied by the above amount of correction of the electronic throttle valve opening so as to obtain the data on the electronic throttle valve opening.

FIG. 6 is a graph, showing the above correction rates. The horizontal axis shows the steering angle, "0" corresponds to the neutral position, and "1" corresponds to the maximum position of the steering angle.

The solid line "a" indicates the correction rate used by the correction rate calculation module 23 in the target engine speed calculation module 9 of FIG. 4. With this solid line "a", correction rate is less than 1, and the larger the steering angle is, the smaller the correction rate is.

The dotted line "b" indicates the correction rate used by the correction rate calculation module 25 in the electronic throttle valve opening calculation module 10A of FIG. 4. With this dotted line "b", correction rate is more than 1, and the larger the steering angle is, the larger the steering angle is, the larger the correction rate is.

FIG. 7 is a flowchart of the running control operation according to the above running control device.

First, a target watercraft velocity is set by a user (step 1). This target watercraft velocity may be any value determined by the user, or may be selected from among a plurality of predetermined values provided by a manufacturer at shipment.

Then, an initial value of a target engine speed is set (step 2). In this case, if the current watercraft velocity is in the vicinity of the target watercraft velocity, the current target engine speed is set as the initial value of the target engine speed. If the current velocity is not in the vicinity of the target watercraft velocity, a predetermined initial value of the target engine speed is used. The initial value of the target engine speed may be any value determined by a user, or may be selected from among a plurality of predetermined values provided by a manufacturer at shipment. With these initial values as references, feedback control is performed, based on the difference between the initial value and the measured current engine speed, such that engine speed follows the target engine speed, as described later.

Then, a correction rate for a target engine speed is calculated, based on the steering angle, according to the solid line "a" of FIG. 6 as mentioned above (step 3). Then, a correction rate for an electronic throttle valve opening is calculated according to the dotted line "b" (step 4).

Then, a target engine speed (step 5) and an opening of an electronic throttle valve is calculated (step 6) using these correction rate.

Then, an electronic throttle valve is dnven, for control, based on the calculated data on the opening of an electronic throttle valve (step 7). In the next step 8, it is determined if the user has terminated the running control. If the running control has not been terminated, then steps 3 through 7 are repeated. If the running control is terminated, the driving mode returns to the normal driving mode (step 9).

FIG. 8 is a block diagram of another embodiment of a running control device according to the invention.

This embodiment is one in which the data on the steering angle is inputted to fuzzy reasoning systems 22 and 24 respectively instead of correction rate calculation modules 23 and 25 in the example of above mentioned FIG. 5 so as to calculate a target engine speed and an opening of the electronic throttle valve. Other structures and working effects of this embodiment are the same as those of the embodiment of FIG. 5.

FIG. 9 is an illustration of a fuzzy rule for calculation of the target engine speed mentioned above.

From membership functions shown in FIG. 9A deduction values of velocity deviation and acceleration are determined, which are applied to the fuzzy rule of FIG. 9B to determine a weighted mean, so as to calculate the amount of correction of the target engine speed (difference between the current engine speed and the target engine speed). Watercraft velocity deviation (difference between the actual watercraft velocity and the target watercraft velocity) of the membership functions is determined from a detected value of the actual watercraft velocity, and acceleration from the detected value by calculation. Four values corresponding to PL and PS on the positive side and NL and NS on the negative side are determined from the membership functions, based on the velocity deviation and the acceleration, and these four values are weighted by the corresponding four values in the fuzzy rule of FIG. 9B to calculate a mean value. Thus, the amount of correction of the target engine speed is obtained. Each value of the fuzzy rule is set, for example, based on skilled driver's experience or knowledge. Therefore, for a velocity detected, an optimum amount of correction of the target engine speed corresponding to the velocity and providing an amount of operation equivalent to the operation by the skilled driver can be obtained.

FIG. 10 is an illustration of a fuzzy rule through which the amount of operation of throttle opening is determined, based on the amount of correction of the target engine speed obtained in FIG. 9.

As in the case of FIG. 9, an engine speed deviation (difference between the target engine speed and the actual engine speed) is obtained from the detected value of the engine speed. An amount of correction of the engine speed is obtained from the detected value of the engine speed by calculation. From these values of membership functions, processing weighted by the fuzzy rule of (B) is performed to obtain the amount of correction of the throttle valve opening. This amount of correction forms an amount of operation for changing the current throttle valve opening.

As described above, control of the electronic throttle valve allows control of the amount of intake air, and thus engine speed is controlled so as to follow the target engine speed, thereby effecting a velocity control such that the watercraft velocity follows the target watercraft velocity.

In small ships with outboard motors, or small ships or small planing watercraft having engines mounted thereon, environmental conditions change drastically due to change in weather or climate, and the resistance to the hull changes widely depending on the number of crew, loadings, and steering angle or trim setting, so that the relation between watercraft velocity and engine speed varies from moment to moment. Therefore, it is difficult for a driver, and particularly beginners, to maintain a constant speed through throttle manipulation, that is, the driver needs to use a difficult ship control technique which necessitates a lot of skill. In order to cope with this problem, in the embodiment as described above, the electronic throttle valve control section of the running control device is constituted by a target engine speed calculation module and an electronic throttle valve opening calculation module. Therefore, the driver is able to run the watercraft at a constant speed without excessive throttle manipulation, and to control the watercraft while concentrating on steering without being distracted by the need for throttle manipulation. Thus, a remarkable effect can be achieved of lightening the burden on the user to control the watercraft, effecting stable running as well as improved stability during ship control, and further of preventing cavitation.

FIG. 11 is a structural diagram of another embodiment of a running control device according to the invention.

This embodiment is one in which a trim driving device is shown in a block in the outboard motor of FIG. 3 mentioned above (In fact, a trim driving device is equipped in the embodiment of FIG. 3). A trim angle can be detected from the trim driving device 8. The other structures and working effects of this embodiment are the same as those of the embodiment of FIG. 3.

FIG. 12 is a block diagram of the running control device of FIG. 11.

The running control device 1 is provided with the electronic throttle valve control section 2A (corresponding to the engine output control section 2 of FIG. 11). The electronic throttle control section 2A includes the target engine speed calculation module 9 for calculating target engine speed in response to the information on target velocity inputted by a user, and the electronic throttle valve opening calculation module 10A (corresponding to the engine output operation amount calculation module 10 of FIG. 11) for calculating opening of the electronic throttle valve 12 such that actual engine speed equivalent to the target engine speed is obtained, and drives the electronic throttle valve 12 by the amount of operation of the calculated electronic throttle valve opening. Thus, intake air for the target engine speed is supplied, so that engine output for the running at the target velocity is achieved, providing automatic cruising control at a constant speed.

FIG. 13 is a flowchart of the running control operation according to the running control device of FIG. 11.

First, a target watercraft velocity is set by a user (step S1). This target velocity may be any value determined by the user, or may be selected from among a plurality of values provided by a manufacturer at shipment.

Then, an initial value of a target engine speed is set (step S2). In this case, if the current watercraft velocity is in the vicinity of the target watercraft velocity, the current target engine speed is set as the initial value of the target engine speed. If the current watercraft velocity is not in the vicinity of the target velocity, a predetermined initial value of the target engine speed is used. The initial value of the target engine speed may be any value determined by a user, or may be selected from among a plurality of values provided by a manufacturer at shipment. With these initial values as references, feedback control is performed, based on the difference between the initial value and the measured current engine speed, such that engine speed follows the target engine speed, as described later.

Next, the target engine speed is calculated by the target engine speed calculation module 9 (FIGS. 11 and 12) (step S3). The target engine speed calculation module is constituted by a fuzzy reasoning system, adopting, for example, a simplified reasoning method as the reasoning method, deduces the amount of correction of the target engine speed from difference between the target velocity and the current velocity, and acceleration, as input, and outputs the sum of the current target engine speed and the amount of correction of the target engine speed, as a new target engine speed. A fuzzy rule table of this fuzzy reasoning system is designed, based on skilled driver's knowledge on ship control, and the fuzzy rule in the simplified reasoning method is represented by real values (see FIG. 9 mentioned above).

Next, an electronic throttle valve opening is calculated, based on this target engine speed (step S4). This electronic throttle valve opening calculation module 10A (FIG. 12), like the target engine speed calculation module, is constituted by a fuzzy reasoning system, adopting a simplified reasoning method as the reasoning method, deduces the amount of electronic throttle valve opening from a difference between the target engine speed and the current engine speed, and the amount of correction of engine speed per unit time, as input, and outputs the sum of the current electronic throttle opening and the amount of correction of electronic throttle valve opening, as a new electronic throttle valve opening (see FIG. 10 mentioned above).

The electronic throttle valve is driven, for control, such that its opening coincides with the electronic throttle valve opening calculated in this way (step S5). In this case, in addition to the control of the electronic throttle valve, the fuel ignition device 6, ignition device 7 and trim driving device 8 shown in FIG. 11 may also be driven, for control, by calculating the respective amounts of operation, based on the target engine speed corresponding to the target velocity.

It is then determined if the user has disabled the running control (step 6). If the user has not disabled the running control then steps 3 through 5 are repeated.

If the user disables the running control (step S6), the electronic throttle valve opening changes gradually to an opening specified by the throttle (throttle lever), and thereafter, normal ship control by the throttle lever is restored (step S7). In this case, since the throttle lever is set at a fixed position without manipulation during running control, the throttle valve is moved to an opening corresponding to the position of the throttle lever at the time of disablement of running control. Therefore, if there is a large difference between the throttle valve opening and the opening indicated by the throttle lever at the time of removal of the control, an abrupt output change is effected, preventing stable running. Thus, throttle opening at the time of disablement of running control is detected to calculate the difference between the actual throttle valve opening and the throttle opening, and the throttle valve is driven, for control, such that it is moved slowly to an opening indicated by the throttle lever. The throttle lever opening may be detected from time to time during running control to be stored as information on throttle opening, and upon transition to normal running control, this throttle opening information may be read out, together with other stored information, to perform opening control of the throttle valve as described above.

In this embodiment, as described above, information on watercraft velocity and acceleration are inputted, the target engine speed is determined, based on these pieces of input information, and the amount of correction of the electronic throttle valve opening is determined such that engine speed follows the target engine speed. The invention is not limited to this embodiment, but the target engine speed calculation module, for example, may be arranged such that input by a user is outputted as the target engine speed without alteration. Specifically, if the target engine speed calculation module is arranged such that the target engine speed can be determined uniquely from throttle opening, this makes it possible to maintain any engine speed desired by a user, and cavitation can also be prevented.

Also, the engine output operation amount calculation module may be arranged such that its gain is adjusted in response to steering angle. Specifically, in the case where an electronic throttle valve opening calculation module constituted by proportional-differential controls is used, if steering angle is small (in the state of straight-ahead running), a riding feeling-oriented control of small engine speed variation can be performed by adjusting differential gain, and if steering angle is large (in the state of turning), a following-up characteristic-oriented control of small target engine speed deviation is performed by adjusting proportional gain.

In the case where the target engine speed is inputted directly, engine speed is controlled as in the previous case of the target velocity being inputted, so that cavitation can be prevented.

Although the foregoing embodiment has been exemplified by a watercraft with an outboard motor incorporating an electronic throttle valve control device, the invention is not limited to this outboard motor, but may be applied, for example, to an inboard or an inboard-outboard motor of a watercraft with an electronic throttle valve, or a water vehicle such as a water bike or other small planing-type watercraft with an electronic throttle valve.

If the running control device described above is applied to cruising control devices for watercrafts, they can be categorized into the following three systems.

(1) Cruising control similar to that of an automobile:

1. Summary: after the watercraft is accelerated to a velocity desired by the driver, cruising control is performed with the velocity at which the switch is activated, as a target velocity.
2. Component: electronic throttle valve, fuel injection device, ignition device, switch, and the like
3. Details of control: a target engine speed is calculated from input velocity and acceleration, and the electronic throttle valve, fuel injection valve and ignition timing are controlled such that engine speed follows the target engine speed.
4. Input information to the target engine speed calculation module: as main information, information on velocity and acceleration, and as sub-information, information on amount of steering operation, trim angle, posture, atmospheric temperature, atmospheric pressure, cooling water temperature, and the like
5. Effect: the driver is able to maintain the target velocity without touching a throttle lever.

(2) Cruising control unique to watercrafts (Part 1):

1. Summary: when the cruising control switch is pressed in any condition (for example, during stoppage), cruise control is performed with the watercraft velocity set by the driver through target velocity input means, as a target watercraft velocity.
2. Component: electronic throttle valve, fuel injection device, ignition device, target velocity input means (lever, terminal), switch, and the like.
3. Details of control: a target engine speed is calculated from input velocity and acceleration, and the electronic throttle valve, fuel injection valve and ignition timing are controlled such that engine speed follows the target engine speed.
4. Input information to the target engine speed calculation module: as main information, information on velocity and acceleration, and as sub-information, information on amount of steering operation, trim angle, posture, atmospheric temperature, atmospheric pressure, cooling water temperature, and the like.

5. Effect: the driver is able to accelerate the watercraft from the state of stoppage to the target velocity and to maintain the velocity without touching a throttle lever. Cavitation can be prevented.

(3) Cruising control unique to watercrafts (Part 2):

1. Summary: The driver inputs a target engine speed corresponding to a constant running speed directly, instead of a target velocity. The target engine speed can be changed.
2. Component: electronic throttle valve, fuel injection device, ignition device, target engine speed input means (lever, dial), switch, and the like
3. Details of control: a target engine speed is calculated from the amount of operation of the target engine speed input means, and the electronic throttle valve, fuel injection valve and ignition timing are controlled such that engine speed follows the target engine speed.
4. Input information to the target engine speed calculation module: as main information, information on amount of lever operation, and as sub-information, information on velocity, acceleration, amount of steering operation, trim angle, posture, atmospheric temperature, atmospheric pressure, cooling water temperature, and the like.
5. Effect: as a result that an engine speed specified by the driver is maintained, running at any constant speed can be effected while cavitation is prevented.

Effect of the Invention

In the invention as described above, if a target watercraft velocity for a constant running speed, or an engine speed corresponding to this target velocity, for example, is inputted to the engine output control section (electronic throttle valve control section), this control section automatically operates the intake air control device (electronic throttle valve) through electrical control according to this target, and automatically controls engine output so as to maintain the target velocity. Therefore, the driver need not take notice of the engine speed being maintained through throttling operation, allowing him to concentrate on steering, providing easier control of the watercraft. Especially, stability in running while turning is improved.

In addition, if cavitation (racing of the propeller) occurs, the amount of operation of the intake air control device is calculated to decrease engine speed, so that an immediate action is taken automatically against cavitation, and any damages to the engine, propeller, or other driving system can be avoided.

Explanation of Symbols

1: running control device
2: engine output control section
2A: electronic throttle valve control section
3: outboard motor
4: intake air control device
5: interface
6: fuel injection device
7: ignition device
8: trim driving device
9: target engine speed calculation module
10: engine output operation amount calculation module
10A: electronic throttle valve opening calculation module
11: interface
12: electronic throttle valve
13: full
14: engine
15: propulsion device
16: running control section
17: propulsion control section
18: target propulsion calculation module
19: operation amount calculation module
20: I/F
21: I/F
22: fuzzy reasoning system
23: correction rate calculation module
24: fuzzy reasoning system
25: correction rate calculation module

What is claimed is:

1. A propulsion control device for a watercraft having a propulsion device, the propulsion control device comprising a propulsion control module for controlling propulsion of the watercraft based on input data, said propulsion control module comprising a target propulsion calculation module for determining a target propulsion based on predetermined input data including at least a velocity of the watercraft, and an operation amount calculation module configured to detect cavitation in the propulsion device based on speed changes of the propulsion device and determining the amount of operation of the propulsion device, based on the predetermined input information, so as to suppress the cavitation in the propulsion device, such that the target propulsion determined by said propulsion calculation module is obtained.

2. The propulsion control device set forth in claim 1, wherein said propulsion device comprises an engine, the propulsion control device comprising an engine output control module for controlling engine output using at least one of an intake air control device for controlling an amount of intake air delivered to the engine, a fuel injection device, and an ignition device, the engine output control module comprising, a target engine speed calculation module for determining a target engine speed based on predetermined input information, including data regarding a velocity of the watereraft, and an operation amount calculation module configured to determine the amount of operation of the engine output control module, based on predetermined input information, such that the target engine speed determined by said target engine speed calculation module is obtained.

3. The propulsion control device set forth in claim 2, wherein the operation amount calculation module is configured to calculate the amount of operation of the engine output control module based on a fuzzy rule.

4. The propulsion control device set forth in claim 2 additionally comprising an electronic throttle valve controlled by the engine output control module.

5. A propulsion control device for a watercraft having a propulsion device, the propulsion control device comprising a propulsion control module for controlling propulsion of the watercraft based on input data, said propulsion control module comprising a target propulsion calculation module for determining a target propulsion based on predetermined input data including at least a velocity of the watercraft, and an operation amount calculation module for determining the amount of operation of the propulsion device, based on the predetermined input information, such that the target propulsion determined by said propulsion calculation module is obtained, wherein said propulsion device comprises an engine, the propulsion control device comprising an engine output control module for controlling engine output using at least one of an intake air control device for controlling an amount of intake air delivered to the engine, a fuel injection device, and an ignition device, the engine output control module comprising, a target engine speed calculation module for determining a target engine speed based on predetermined input information, including data regarding a velocity of the watercraft, and an operation amount calculation module configured to determine the amount of operation of the engine output control module, based on predetermined input information, such that the target engine speed determined by said target engine speed calculation module is obtained, and wherein the target engine speed calculation module is configured to determine the target engine speed based on at least a velocity of the watercraft, acceleration of the watercraft, engine speed, trim angle, pitch angle, an engine load request by a user, and at least one of steering angle and rolling angle.

6. The propulsion control device set forth in claim 5, wherein the target engine speed calculation module is configured to determine the target engine speed based on at least a steering angle and to decrease the target engine speed as the steering angle increases relative to a neutral position.

7. The propulsion control device set forth in claim 5, wherein the target engine speed calculation module is configured to determine the target engine speed based on at least a roll angle and to decrease the target engine speed as the roll angle increases relative to a neutral position.

8. A propulsion control device for a watercraft having a propulsion device, the propulsion control device comprising a propulsion control module for controlling propulsion of the watercraft based on input data, said propulsion control module comprising a target propulsion calculation module for determining a target propulsion based on predetermined input data including at least a velocity of the watercraft, and an operation amount calculation module for determining the amount of operation of the propulsion device, based on the predetermined input information, such that the target propulsion determined by said propulsion calculation module is obtained, wherein said propulsion device comprises an engine, the propulsion control device comprising an engine output control module for controlling engine output using at least one of an intake air control device for controlling an amount of intake air delivered to the engine, a fuel injection device, and an ignition device, the engine output control module comprising, a target engine speed calculation module for determining a target engine speed based on predetermined input information, including data regarding a velocity of the watercraft, and an operation amount calculation module configured to determine the amount of operation of the engine output control module, based on predetermined input information, such that the target engine speed determined by said target engine speed calculation module is obtained, and wherein the target engine speed calculation module is configured to determine the target engine speed based on a fuzzy rule.

9. A propulsion control device for a watercraft having a propulsion device, the propulsion control device comprising a propulsion control module for controlling propulsion of the watercraft based on input data, said propulsion control module comprising a target propulsion calculation module for determining a target propulsion based on predetermined input data including at least a velocity of the watercraft, and an operation amount calculation module for determining the amount of operation of the propulsion device, based on the predetermined input information, such that the target propulsion detennined by said propulsion calculation module is obtained, wherein said propulsion device comprises an engine, the propulsion control device comprising an engine output control module for controlling engine output using at least one of an intake air control device for controlling an amount of intake air delivered to the engine, a fuel injection device, and an ignition device, the engine output control module comprising, a target engine speed calculation module for determining a target engine speed based on predetermined input information, including data regarding a velocity of the watercraft, and an operation amount calculation module configured to determine the amount of operation of the engine output control module, based on predetermined input information, such that the target engine speed determined by said target engine speed calculation module is obtained, and wherein the operation amount calculation module is configured to determine the amount of operation of the engine output control module based on at least target engine speed, engine speed, velocity, acceleration of the watercraft, trim angle, pitch angle, and at least one of steering angle and roll angle.

10. A propulsion control device for a watercraft having a propulsion device, the propulsion control device comprising a propulsion control module for controlling propulsion of the watercraft based on input data, said propulsion control module comprising a target propulsion calculation module for determining a target propulsion based on predetermined input data including at least a velocity of the watercraft, and an operation amount calculation module for determining the amount of operation of the propulsion device, based on the predetermined input information, such that the target propulsion determined by said propulsion calculation module is attained, wherein said propulsion device comprises an engine, the propulsion control device comprising an engine output control module for controlling engine output using at least one of an intake air control device for controlling an amount of intake air delivered to the engine, a fuel injection device, and an ignition device, the engine output control module comprising, a target engine speed calculation module for determining a target engine speed based on predetermined input information, including data regarding a velocity of the watercraft, and wherein the operation amount calculation module is configured to calculate the amount of operation of the engine output control module based on a fuzzy rule, and wherein the operation amount calculation module is configured to increase the amount of operation as steering angle increases relative to a neutral position.

11. A propulsion control device for a watercraft having a propulsion device, the propulsion control device comprising a propulsion control module for controlling propulsion of the watercraft based on input data, said propulsion control module comprising a target propulsion calculation module for determining a target propulsion based on predetermined input data including at least a velocity of the watercraft, and an operation amount calculation module for determining the amount of operation of the propulsion device, based on the predetermined input information, such that the target propulsion determined by said propulsion calculation module is attained, wherein said propulsion device comprises an engine, the propulsion control device comprising an engine output control module for controlling engine output using at least one of an intake air control device for controlling an amount of intake air delivered to the engine, a fuel injection device, and an ignition device, the engine output control module comprising, a target engine speed calculation module for determining a target engine speed based on predetermined input information, including data regarding a velocity of the watercraft, wherein the operation amount calculation module is configured to calculate the amount of operation of the engine output control module based on a fuzzy rule, and wherein the operation amount calculation module is configured to increase the amount of operation as rolling angle increases relative to a neutral position.

12. A propulsion control device for a watercraft having a power source driving a propulsion device and a steering device, the propulsion control device being configured to detect cavitation based on speed changes in the power source and to reduce a power output of the power source when the steering device is moved to a position which causes the watercraft to turn, wherein the propulsion control device is configured to reduce the power output of the power source to suppress the cavitation occurring in the propulsion device.

13. The propulsion control device according to claim 12, wherein the propulsion device is a jet pump.

14. The propulsion control device according to claim 12, wherein the propulsion control device operates on a fuzzy-logic principle, the propulsion control device being trained by inexperienced watercraft writer.

15. The propulsion control device according to claim 12, wherein the watercraft is a personal watercraft.

16. A watercraft comprising a hull which defines a rider's area, an engine supported by the hull, a propulsion device supported by the hull and driven by the engine, and engine input device disposed in the rider's area and configured to be operable by a rider of the watercraft, and a propulsion control device configured to control a power output of the engine based on an output of the input device, the propulsion control device being configured control the output of the engine based on at least target engine speed, actual engine speed, a speed of the watercraft, acceleration of the watercraft, trim angle, pitch angle, and at least one of steering angle and roll angle.

17. The watercraft according to claim 16, wherein the propulsion control device is configured to operate according to a fuzzy-logic principle.

18. The watercraft according to claim 17, wherein the propulsion control device is trained by an experienced watercraft rider.

19. The watercraft according to claim 17, wherein the watercraft is a personal watercraft.

20. The watercraft according to claim 17, additionally comprising a straddle-type seat and handlebars mounted in the rider's area and positioned such that a rider can operate the input device and the handlebars while sitting on the straddle-type seat.

* * * * *

UNITED STATES PATENT AND TRADEMARK OFFICE

CERTIFICATE OF CORRECTION

PATENT NO. : 6,855,020 B2
APPLICATION NO. : 10/169789
DATED : February 15, 2005
INVENTOR(S) : Hirotaka Kaji It is certified that error appears in the above-identified patent and that said Letters Patent is hereby corrected as shown below:

At column 14, line 38, in Claim 2, please delete “watereaft” and insert -- watercraft --, therefor.

At column 15, line 62, in Claim 9, please delete “detennined” and insert -- determined --, therefor.

At column 18, line 17, in Claim 20, after “claim 17” please delete “,”.

Signed and Sealed this

Sixth Day of May, 2008

JON W. DUDAS
*Director of the United States Patent and Trademark Office*